No. 725,767. PATENTED APR. 21, 1903.
W. B. POTTER.
SYSTEM OF CONTROL FOR ELECTRICALLY PROPELLED VEHICLES.
APPLICATION FILED JULY 22, 1898.
NO MODEL. 2 SHEETS—SHEET 1.
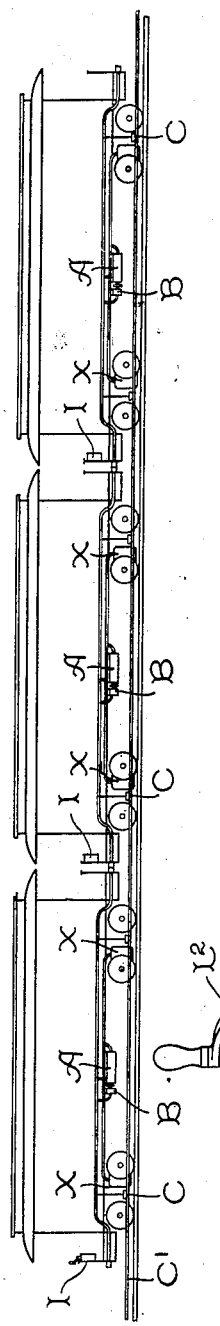
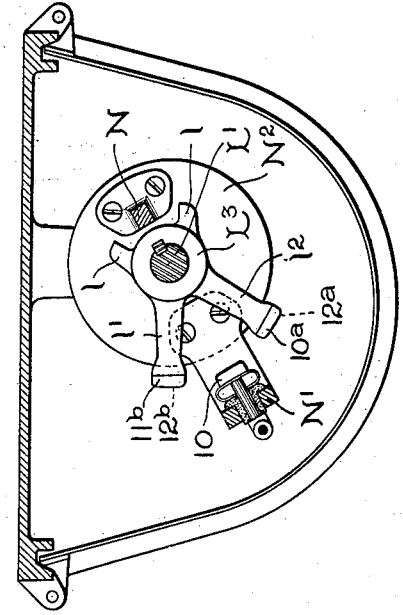
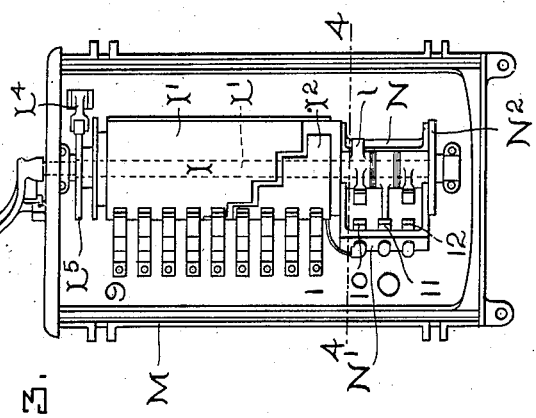
WITNESSES.
A.H.Abell.
A.F.Macdonald.
INVENTOR.
Wm. B. Potter
by Albert G. Davis
Atty

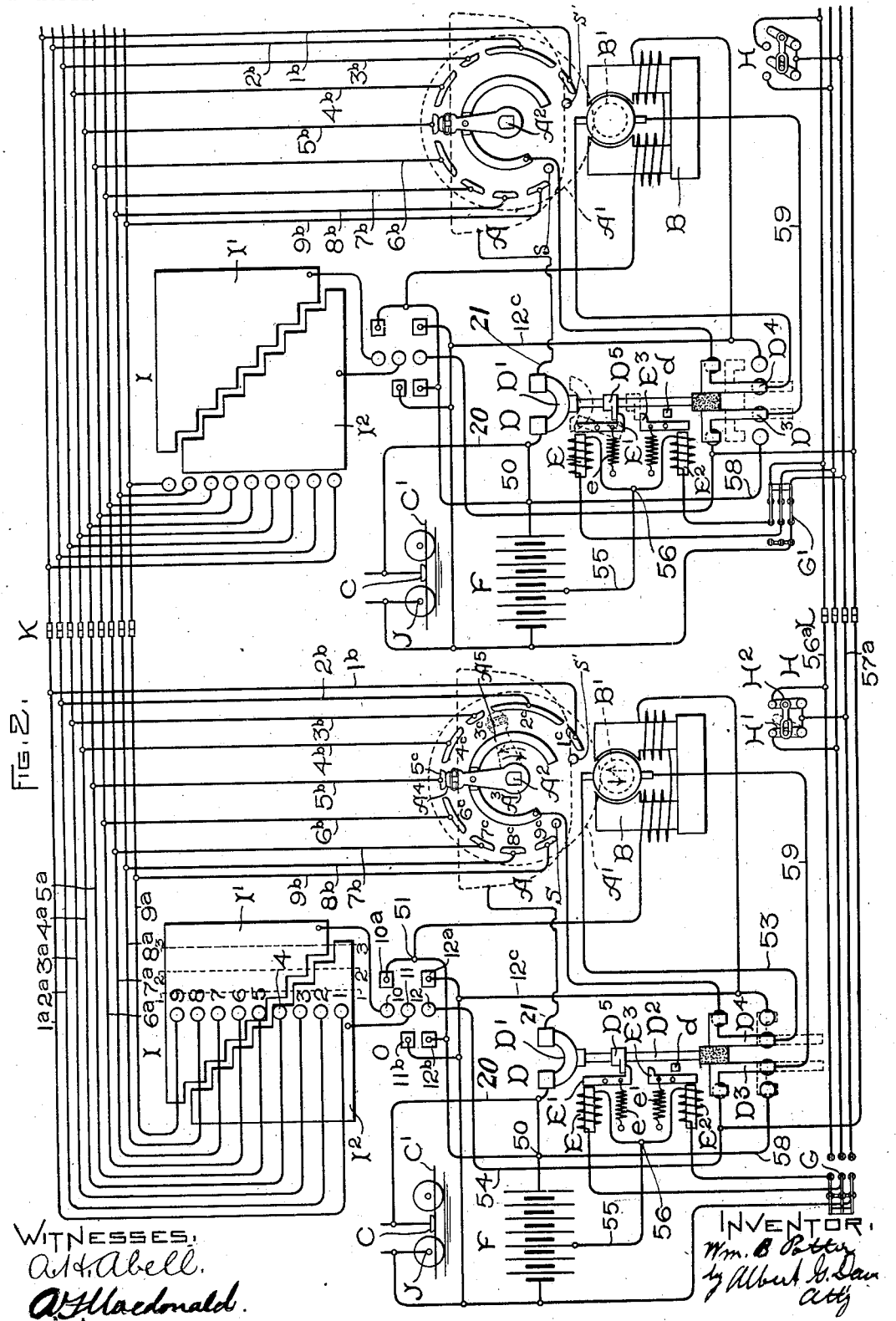

United States Patent Office.

WILLIAM B. POTTER, OF SCHENECTADY, NEW YORK, ASSIGNOR TO THE GENERAL ELECTRIC COMPANY, A CORPORATION OF NEW YORK.

SYSTEM OF CONTROL FOR ELECTRICALLY-PROPELLED VEHICLES.

SPECIFICATION forming part of Letters Patent No. 725,767, dated April 21, 1903.

Application filed July 22, 1898. Serial No. 686,561. (No model.)

*To all whom it may concern:*

Be it known that I, WILLIAM B. POTTER, a citizen of the United States, residing at Schenectady, in the county of Schenectady, State of New York, have invented certain new and useful Improvements in Systems of Control for Electrically-Propelled Vehicles, (Case No. 695,) of which the following is a specification.

My invention relates to systems of control for electrically-propelled vehicles, and is particularly useful in connection with those systems in which a number of motor-cars are united to form a train, each car being provided with a propelling motor or motors, a controller therefor, and one or more master-controllers capable of regulating the operation of all the motor-controllers of the train, though it is not restricted to such systems.

My invention has for one of its objects to provide a system of control for train-propelling motors in which all the motor-controllers on the train are synchronously actuated in a step-by-step manner by a suitable mechanism controlled and regulated by electromagnetic means from one or more master-controllers located at any convenient point or points on the train.

My invention also comprises certain new emergency-brakes and various arrangements and combinations to be hereinafter more particularly described and claimed.

In the accompanying drawings, which show an embodiment of my invention, Figure 1 is a diagrammatic representation of a three-car train. Fig. 2 is a diagram of the circuit connections of a two-car train, each car being provided with a master-controller, a motor-controller, and a pilot-motor for operating the motor-controller. Fig. 3 is a front elevation of the master-controller, and Fig. 4 is an enlarged section taken on line 4 4 of Fig. 3.

In illustrating my invention the controllers for the propelling-motors have been shown in a conventional manner only, as the particular type of controller, with its changes of motor combinations, forms no part of the invention.

The invention need not necessarily be applied to a complete controller which regulates the propelling-motors from lowest to highest speeds, but may be applied to a part of such a controller, which part is arranged to partially establish certain circuits, or it may be applied to a switch for completing certain circuits other than those of the propelling-motors.

In Fig. 1 I have shown my invention in connection with a three-car train, each car being provided with propelling-motors X, which are mounted on the axles in any well-known manner. Each car is provided with a master-controller I and a motor-controller A, which is driven by a pilot-motor B. The arrangement of controllers and motors is such that the car may be controlled from any one of the master-controllers. It is obvious that two master-controllers could be located on each car, one at each end. Each car is provided with a contact-shoe C, which is arranged to slide along the conductor-rail C'.

Referring now to Fig. 2, each motor-controller A (shown in dotted lines) is preferably provided with a gear A', which is rigidly secured to the operating-shaft $A^2$ and meshes with the pinion B' of the pilot-motor B. The motors B are shown as provided with shunt field-windings, which are permanently included in circuit, and to reverse the motors the direction of current in the armature-circuit is changed in a manner hereinafter pointed out. Mounted on a suitable insulating-support on the controller and arranged in the form of a circle are contacts $1^c$ to $9^c$, inclusive. Mounted for engagement with these contacts is a spring-pressed contact $A^4$, carried by the outer end of an arm $A^3$, which is rigidly secured to the operating-shaft of the controller. On the under side of the arm is a brush arranged to make contact with the segmental plate $A^5$. These contacts $1^c$ to $9^c$, together with the movable contact $A^4$, constitute what I have termed an "auxiliary controller" for the electromagnetic actuating device or pilot-motor B, for it is through these contacts that the circuit which controls the operation of the pilot-motor is completed.

The number and arrangement of the contacts $1^c$ to $9^c$, inclusive, is varied in accordance with the number of steps or positions on the controller A. In the present instance four steps are shown on each side of the central or off position, one set being for braking and the other set for power. By making some of the contacts longer than others—as contact 2ª, for example—the angular distance which the cylinder of the controller A will travel for a given step on the master-controller may be varied as desired.

The arrangement of the contacts of the controller A, I have deemed it unnecessary to illustrate in this application, since it constitutes no part of my present invention. It may be stated, however, that in the particular arrangement illustrated a controller of the double-developed type would be used, the contacts on one side of the off position of the controller-cylinder being arranged to make the proper connections between the motors and the power-circuit for supplying current to drive the motors and the contacts on the other side of the off position being arranged to short-circuit the motors on themselves, either directly or through suitable brake-shoe-actuating coils, for bringing the car or train to rest.

The particular arrangement of the controller-contacts either in the braking or in the power positions of the controller is of course of no importance in so far as my present invention is concerned, it being understood that any of the arrangements which have been devised for the purpose are suitable to be used in connection with my invention. One such arrangement of controller-contacts is shown in Fig. 8 of the drawings in my Patent No. 617,601, granted January 10, 1899.

Instead of having a controller capable of a step-by-step movement I may substitute a two-way switch arranged to have either one or two operative positions and an off position.

Current is supplied to the apparatus on the cars by contact-shoes C, which make sliding connection with the third rail or conductor C'. In circuit with the electric apparatus on each car is an automatic circuit-breaker D, having its contacts connected on the one side to a conductor 20, leading from the contact-shoes C, and on the other to the conductor 21, leading into the controller-casing, where it is connected to the trolley-contact of the motor-controller. The circuit-breaker normally occupies the position shown in the drawings, but is capable of assuming two other positions. One of these alternative positions is shown by dotted lines on the right-hand breaker; the second is when the movable member has dropped to a still lower position, and the dog $D^5$ rests on the stop $d$. The breakers are similar in construction, and each contains two fixed terminals, which are bridged by a moving contact $D'$. The contact $D'$ is mounted on the upper end of a rod $D^2$, and on the bottom of the rod are inverted-L-shaped contacts $D^3 D^4$, which are insulated from one another and each arranged to complete certain circuits by contact with the stationary terminals shown. Rigidly secured to the rod is a dog $D^5$, which in the closed or first position of the breaker engages with the pivoted armature $E'$, in the second position with the pivoted armature $E^3$, and in the third with the stop $d$.

The action of the armature $E'$ is controlled by a magnet E, working against a spring $e$, and the action of the armature $E^3$ is controlled by a magnet $E^2$, working against a spring $e'$. The magnets E $E^2$ are energized by a number of cells of the storage battery F and their circuits are controlled by means of the switch G. The switch G consists of three metal blades, which are pivoted to suitable terminals in circuit with one set of wires and are arranged to engage with corresponding terminals in the other set of wires when the switch is in its closed position.

To cut the apparatus of the adjacent and following cars out of circuit, a double-pole cut-out switch H is provided, the two blades being capable of separate and simultaneous movement. When blade $H'$ is moved to its dotted-line position, it trips the breaker or breakers on the adjacent car or cars, and when blade $H^2$ is moved also it establishes certain connections in a manner to apply the brakes of the rear car or cars, all of which will be described in detail later.

The master-controllers I consist of two similarly-notched metal plates $I'$ and $I^2$, upon which the vertical row of stationary brushes 1 to 9, inclusive, rest. These brushes are connected in multiple arc with the cable-wires $1^a$ to $9^a$, inclusive. The plates $I'$ and $I^2$ have been shown developed in a single plane to facilitate the reading of the diagram, but in practice the plates are mounted on a cylinder in the ordinary manner and are movable with respect to the brushes.

Situated under the master-controller is a reversing-switch O for reversing the direction of rotation of the pilot-motors B. The reversing-switch comprises relatively fixed and moving contacts, and in practice this switch is arranged to operate with the master-controller; but for the purpose of illustration it is simpler to consider it as a separate switch having a suitable operating-handle. The mechanical construction is, however, described hereinafter.

Extending through the cars on the train are cables K and L. The former contains all the wires which lead to the master-controllers I and the latter the wires which control the emergency-brakes of the various cars, switches also being provided for cutting out all the electrical apparatus mounted on the cars.

Referring to Figs. 3 and 4, the mechanical construction of the master-controller will be described. Mounted within a suitable casing M is a contact-cylinder I, which is provided with two sets of contacts $I'$ and $I^2$. The cylinder is loosely sleeved on the shaft $L'$, which is provided with bearings in the casing, and is adapted to be actuated by the handle $L^2$. To insure a step-by-step movement of the cylinder I, a star-wheel $L^5$ is mounted on the shaft, and a pawl $L^4$ is mounted in the top of the casing for engagement therewith. Situated under the main cylinder is a reversing-switch O, which is capable of a certain amount of movement independent of the switch-cylinder I and also of a certain amount of movement with the cylinder. This is accomplished by the following means: Rigidly mounted on the shaft $L'$ is a casting $L^3$, Fig. 4, which is provided with a pair of lugs $l$, adapted to engage the stop N, and a pair of contact-arms $l'$ and $l^2$, the former carrying at its outer end the contacts $11^b$ and $12^b$ and the latter the contacts $10^a$ and $12^a$. These contacts are arranged to engage with the spring-pressed contacts 10, 11, and 12, which are mounted on the U-shaped frame $N'$, the said frame being supported at the bottom by the disk $N^2$, which is sleeved on the shaft $L'$, and at the top by the cylinder I.

The operation of the controller is as follows: The handle $L^2$ when moved in the arc of a circle first causes the contacts $10^a$ and $12^a$ or $11^b$ and $12^b$ to move toward the contacts 10, 11, and 12, depending upon which direction it is moved from a central position. As soon as one or the other of lugs $l$ engages with the stop N the contacts 10, 11, and 12, and also the contact-plates $I'$ and $I^2$, begin to travel with the handle and will continue as long as the handle moves in the same direction. As soon as the direction of motion of the handle is reversed the circuit of the reversing-switch is interrupted by reason of the lost-motion device; but as soon as one of the lugs $l$ engages with the stop N the circuit of the reversing-switch is completed, and a further movement of the handle causes the cylinder I to pass the vertical row of stationary brushes. It will be seen that by this arrangement the reversing of the pilot-motors is accomplished by the movement of the controller-handle.

The action of my invention is as follows: Assuming that it is desired to propel the train in a forward direction, the pilot-motor-reversing switch O is moved to a point where the brushes 10 and 12 will engage with the contacts $10^a$ and $12^a$, and the circuit of the pilot-motors is as follows: From contact-shoe C to point 50, where the circuit divides, one path being through the battery F to ground J, which charges the battery. The second path is from point 50 to point 51, where the circuit again divides, one path being through the field-magnet winding of the pilot-motor B to wire $12^c$ and to ground J. Returning to point 51, the second path is to contact $10^a$, to brush 10, to notched plate $1'$, to brush 5, to cable-wire $5^a$, to wire $5^b$, to contact $5^c$, through the contact on the movable arm, to segmental plate $A^5$, to circuit-breaker D, by contact $D^4$, to wire 53, through the armature of motor B in the direction indicated by the full-line arrow, to the circuit-breaker D, by contact $D^3$ to wire 54, to brush 12, contact $12^a$, and to ground J. This will start the pilot-motor B into action, and the motor-controller A will be propelled in a direction indicated by the full-line arrow and will continue to move until the contact $A^4$ passes out of engagement with the fixed contact $5^c$, thus breaking the circuit of the armature of the pilot-motor. If, now, the master-switch is moved to the position 1 1, a circuit is established through the brush 4 and cable-wire $4^a$, wire $4^b$, and contact $4^c$, and thence, as before, through the armature of the pilot-motor. The pilot-motor will start in motion again and will continue to move until the contact $A^4$ has passed out of engagement with the contact $4^c$. The width of the contact on the moving arm is greater than the space between the circularly-arranged contacts, so that the moving contact does not leave one of the fixed contacts until it has already come into engagement with the one next adjacent. As soon as the motor B has advanced the controller to a point where the contact on the arm $A^3$ is no longer in engagement with the contact $4^c$ the armature-circuit of the motor is interrupted and the controller A will stop at this point and establish any predetermined circuit relations of the electrical apparatus on the train. In order to move the cylinder of controller A into its next position, the master-switch is advanced to line 2 2, which causes the current to flow through the brush 3, cable-wire $3^a$, wire $3^b$, and contact $3^c$. Switch-arm $A^3$ being in engagement with contact $3^c$, due to the arrangement previously described, current will be supplied to the armature of motor B, which will run until the contact-arm $A^3$ interrupts the circuit between contact $3^c$ and segmental plate $A^5$ and rests on the contact $2^c$, as shown in dotted line on the left-hand controller, and is in position to receive current as soon as the master-switch I is advanced to its next position. To move the motor-controller to the highest speed position, the master-controller I is moved to a point where the brushes rest on the line 3 3. This energizes the contacts $5^c$, $4^c$, $3^c$, and $2^c$, thereby causing the motor to run until the arm $A^3$ moves off of contact $2^c$ and interrupts the circuit. The contact $1^c$ is so arranged that it serves to complete the circuit of the pilot-motor when it is desired to return the controller to the off position or to move it back one step. When the arm $A^3$ advances from the off position to the contact $1^c$, it does not complete the circuit of that contact, for the reason that the brush 1, cable-wire $1^a$, wire $1^b$, and contact $1^c$ are only in circuit when the brush 11 rests on contact $11^h$, and this only occurs when the pilot-motor-reversing switch is thrown. Assuming that it is desired to move the motor-controller cylinder back one notch or position, the pilot-motor-reversing switch O is moved to a point where brushes 11 and 12 will engage, respectively, with contacts $11^b$ and $12^b$, and the circuits are as follows, (with the arm $A^3$ in the position shown in dotted lines and the contacts of the master-controller in the position 2 2:) Current passes from the trolley C to the circuit-breaker D, to point 50, to contact $12^b$, to brush 12, to circuit-breaker D, to contact $D^3$, through the armature of the pilot-motor in the direction indicated by the dotted arrow, by wire 53 to circuit-breaker D, by contact $D^4$ to segmental plate $A^5$ on the controller, to the switch-arm $A^3$, to contact $2^c$, wire $2^b$, cable-wire $2^a$, to brush 2, to notched plate $I^2$, to brush 11, to contact $11^b$, to ground J. It will be seen that as soon as the pilot-motor-reversing switch is thrown the notched plate $I'$ is cut out of circuit and the notched plate $I^2$ is cut into circuit by means of brush 11. As soon as current passes through the armature in the manner above described the controller A is rotated in the direction indicated by the dotted arrow until the switch-arm $A^3$ rests on contact $3^c$, and the armature-circuit is interrupted. If it is desired to move the motor-controller to the off position, the master-controller I is moved to a position where the contacts and brushes are as shown, and the pilot-motors will run until their armature-circuits are interrupted. By this arrangement it will be seen that all the motor-controllers on the train are synchronously actuated in a step-by-step manner, each motor-controller - contact - arm traveling until it reaches an open-circuit position. This insures the proper position of the motor-controller for each step of the master-controller. By utilizing the battery F the pilot-motors may be driven forward and back whether or not power is being supplied from the line, thus rendering the operation of the controllers possible at all times. Another important feature of this arrangement is that it permits the motor-controllers to be moved back one or more notches or positions, as well as advanced, and the same synchronous step-by-step action preserved at all times. Inasmuch as the armature-circuit is open-circuited, as soon as the arm on each motor-controller has traveled to the desired position the amount of current for operating the controllers is reduced to a minimum.

The motor - controllers are designed for movement on both sides of a central or off position, power and brake, respectively; but as their operation is accomplished in the same manner as above described, except that for braking the contacts on the master-controller I are moved to the right with respect to the brushes instead of to the left, it will be unnecessary to enter into a detailed description of the circuits.

The action of the circuit-breakers will now be described. Assuming that the train is being propelled forward in the usual manner and for some reason it is desired to cut out quickly the motors on all the cars, the switch-blade $H'$, located on the first car, is moved to the position shown in dotted lines. This opens the circuit of the magnets E on all the cars, provided the switches G and $G'$ are closed, and the pivoted armatures $E'$ release the dogs $D^5$, and the circuit-breakers drop to the position shown in dotted lines on the right hand of the figure, dog $D^5$ resting upon the upper end of armature $E^3$. Connection with the two fixed terminals and the moving contact $D'$ is hereby broken, and the supply of current to the propelling-motors is thus interrupted. The circuits of the magnets are now as follows: from the battery F by wire 55 to point 56, where the circuit divides, one path being through the lower magnet $E^2$, switch $G'$, to the cable-wire $56^a$, thence to switch H, through the right-hand blade to cable-wire $57^a$ to switch $G'$, thence to the negative side of the battery. This will energize magnet $E^2$ and maintain the armature $E^3$ in the position shown; but the circuit from point 56 is open-circuited by the switch-blade $H'$, and armature $E'$ is moved to the dotted-line position by spring $e$. As soon as the circuit-breaker drops to the position shown in dotted lines the current which is supplied to the propelling-motors and their controllers is instantly interrupted. Assuming that the train is running in a normal manner and that it is desired to quickly apply the brakes to the rear cars, both blades of switch H on the first car are moved to the right, which breaks the circuit of magnets E $E^2$. This will permit the circuit-breaker to drop down to a point where dog $D^5$ rests on the stop $d$, and the inverted-L-shaped terminals $D^3$ and $D^4$ bridge the lower terminals on the breaker. This movement of the circuit-breaker closes a circuit between the battery and the armature of the pilot-motor $B'$ in such a manner that current will flow in the direction of the dotted arrow. The pilot-motor will thus be caused to operate and will turn the cylinder of the controller A from whatever position it may occupy back through the off position to the braking positions of the controller, and this movement will be continued until the controller has been brought to its final braking position. There are therefore two different ways in which the controllers A on the several cars may be brought into their braking positions—one by the operation of any one of the master-controllers I (in this case the movement may be made step by step and may be stopped at any one of the braking positions) and the other by the operation of one of the switches H. The master-controller is ordinarily used in braking the car or train, and the switch H, which is an emergency-switch, is intended to be operated only when it is desired to stop the train as quickly as possible. The switch H and the mechanisms controlled thereby constitute what I have termed an "emergency-brake system," for as soon as this switch has been operated the motor-controllers are immediately set in operation and are moved without a stop to the final braking position.

No braking-circuits are shown in the drawings, for they would only tend to confuse my invention. Evidently any desired arrangement of contacts may be used. The circuit leading from the contacts of the circuit-breaker D are connected, of course, in the usual manner to the power-contacts of the controller A (see, for example, Fig. 8 of the drawings in my Patent No. 617,601, above referred to) and through them to the motor-circuits.

The switches G G', &c., control the connections between the circuit-breaker-actuating devices on the several cars and the conductors in the cable L, to which the switches are connected. When all of the switches G G', &c., are closed, the operation of the switch H on the forward car will cause the simultaneous operation of all the circuit-breakers on the train, while with these switches arranged as shown in Fig. 2 of the drawings the circuit-breakers on all except the first car of the train will be caused to operate either by the opening of the switch H on the forward car or by the breaking apart of the cable L.

Returning now to a consideration of the emergency-brake system and tracing the circuit completed by the circuit-breaker in its lower position, the circuit through the field-magnets of the pilot-motors being complete at all times, (it is unnecessary to follow the circuit in detail,) the armature-circuit will be as follows: from contact-shoe C to point 50, by wire 58 to contact $D^3$, to wire 59, through the armature in the direction indicated by the dotted arrow, to the circuit-breaker D, by wire $12^c$ to ground J. This will cause the motor to rotate in the proper direction to move the cylinder of the controller A to the left and complete the brake-circuits of the train either by converting the propelling-motors into generators or establishing the circuit of a suitable source of energy. The pilot-motor with the circuits arranged as above described will continue to run until the arm $A^3$ strikes the stop S, located at the last braking position. The revolution of the arm $A^3$ in the other direction over the power-contacts will be arrested by the stop S'. It will be seen that this operation may be effected whether the main source of supply is complete or not. As soon as the main source of supply fails the battery F is in operative position to drive the pilot-motors and establish any desired circuit relations. To resume the normal operation of the train, both blades of the switch H are moved to the position shown in full lines on the left-hand car and the circuit-breakers closed by hand, the armature E' retaining the circuit-breaker in place.

In the normal operation of the system switches corresponding to switch H are all open with the exception of the one located on the front car, and all the circuit-breakers on the train are controlled by this switch. When, however, the train accidentally separates, due to any cause, the circuits of the cable-wires and battery are interrupted, and the breakers on the separate cars will act in a manner corresponding to that described in connection with the emergency position of switch H.

What I claim as new, and desire to secure by Letters Patent of the United States, is—

1. In a system of train control the combination with electric motors on the several cars of interconnecting electric conductors, and means whereby the breaking of said conductors will cut off the current flowing to the motors, and cause the motors to act as generators.

2. In a system of train control the combination with motors connected to collecting devices in their own several cars, of train-conductors and means whereby the breaking of said conductors will cause the motor-supply circuits to be opened and the motors to operate as generators.

3. In a system of train control the combination with electric motors on the several cars connected to the respective collectors thereof, electrically-operated controllers therefor, interconnected conductors extending between the cars, auxiliary sources of electricity on the several cars for operating said controllers, and means whereby the breaking of said conductors will open the main supply-circuit and cause the motors to act as generators.

4. In a train-control system the combination with motors on the several cars connected to the respective collecting devices thereof, of a motor-controller on each car, electromagnetic means for actuating said controllers, means for cutting the motors out of circuit and causing them to act as generators, and auxiliary sources of electricity to operate said actuating means when the supply-circuit is cut out.

5. In an emergency-brake for an electrically-operated train the combination with the car-motors of controllers therefor, electrically-operated actuators for said controllers, electrically-operated circuit-breakers adapted to cut all the motors out of the supply-circuit and cause them to operate as generators, and an auxiliary source of electricity for said actuators and circuit-breakers.

6. In an emergency-brake for an electrically-operated train the combination with the car-motors of controllers therefor, electrically-operated actuators for said controllers, circuit-breakers adapted to open the supply-circuit and cause the motors to operate as generators, interconnecting conductors extending throughout the train, switches for said conductors on each car, and auxiliary sources of electricity for said actuators and circuit-breakers.

7. In a system of train control the combination with the car-motors of controllers therefor, electrically-operated actuators for said controllers, master-controllers each adapted to control all said actuators, and means operated at each car and independent of said master-controllers for cutting off the current supplied to all the motors, and causing them to operate as generators.

8. In a train-control system the combination with a motor-controller on each car, of electrically-operated means for actuating each controller, an auxiliary source of electricity on each car, and a circuit-breaker on each car, all of which circuit-breakers may be simultaneously operated to open the supply-circuit and move their respective motor-controllers to the braking position.

9. In a train-control system the combination with a motor-controller on each car, a master-controller on each car, and a separate switch on each car adapted to open the supply-circuits to all the motors and cause the motors on all the cars to act as generators.

10. In a controller, the combination with the switch-cylinder provided with circuit-controlling contacts, of two sets of contacts mounted on a member capable of a certain amount of movement relative to said switch-cylinder, another set of contacts carried by said switch-cylinder and adapted to engage with the contacts of one or the other of said sets, means for operating the controller, and means whereby the said operating means in its first movement in either direction causes the contacts of one or the other of said two sets to engage the set of contacts carried by the switch-cylinder.

11. In a controller the combination with a rotatable shaft of a sleeve loosely mounted thereon, contacts carried by said sleeve, and a switch secured to said shaft and adapted to be brought intermittently into engagement with the contacts on said sleeve.

12. In a controller the combination with a rotatable shaft of a sleeve mounted thereon, reverse-contacts carried by said sleeve and a reverse-switch secured to said shaft and adapted to positively engage with said sleeve and coöperate with said contacts.

13. A controller comprising a rotatable member provided with contacts, fixed contacts arranged to engage with certain of the contacts on said rotatable member, a shaft for operating said controller, and contact members carried on said shaft and adapted to intermittently engage with certain of the contacts on the rotatable member.

14. A controller, comprising a rotatable member, contacts carried by said member, means for rotating said member, and a plurality of contact members connected to said means and adapted to intermittently engage with the contacts carried by the rotatable member.

15. A controller comprising a rotatable member sleeved on a shaft, contacts carried by said shaft and adapted to engage corresponding contacts on the said rotatable member, and a lost-motion connection between said shaft and said rotatable member.

16. A controller comprising a rotatable member sleeved on a shaft, reversing-contacts carried by said shaft and adapted to engage corresponding contacts on the said rotatable member as the shaft is rotated in one direction or the other, and a lost-motion connection between said shaft and said rotatable member.

17. The combination with a main controller of an auxiliary controller having contacts and a movable contact-piece adapted to engage successively therewith, an electromagnetic device for actuating said main controller and said contact-piece, and means for completing the circuit of said device through each of said contacts and said contact-piece.

18. The combination with a main controller of an electromagnetic device adapted to actuate the same, an auxiliary controller for controlling the operation of said electromagnetic device, and means for completing the circuit of said device through the contacts of said auxiliary controller in various successive positions of the latter, whereby said device is momentarily operated to move said controller into a new position, and the circuit of said device is broken.

19. The combination with a controller having contacts of various lengths and a movable contact-arm adapted to engage successively therewith, of an electromagnetic device for actuating said contact-arm, and means for completing the circuit of said device through each of said contacts and said arm.

20. In a train-control system, a master-controller comprising a set of fixed contacts and two sets of movable contacts arranged to engage with the contacts of the fixed set, and a reversing-switch operating in its opposite positions to connect into circuit one or the other of said sets of movable contacts.

21. A controller for electric circuits, comprising in combination, two sets of movable contacts and a single set of fixed contacts, the said two sets of contacts being separated along a line at an angle to the line of said single set of contacts.

22. A controller for electric circuits comprising in combination, a single set of contacts mounted on a suitable support, and two sets of contacts arranged to engage with the single set and movable with respect thereto, said two sets of contacts being separated along a line at an angle to the line of said single set of contacts.

23. A controller for electric circuits comprising in combination, a single set of contacts mounted on a suitable support, two sets of contacts arranged to engage with the single set and movable with respect thereto, said two sets of contacts being separated along a line at an angle to the line of said single set of contacts, and means for connecting either one of said two sets of contacts into circuit.

24. A controller for electric circuits comprising in combination, a single set of contacts mounted on a suitable support, two sets of contacts arranged to engage with the single set and movable with respect thereto, said two sets of contacts being separated along a line at an angle to the line of said single set of contacts, and a reversing-switch operating to alternately connect one of said two sets of contacts into circuit.

25. In a train-control system the combination with a motor-controller on each motor-car, of electromagnetic means for actuating each controller, and electromagnetic means on each car for opening the supply-circuit of all the motors, and making said electromagnetic actuating means operative.

26. In a train-control system, the combination with motors on each car, of devices on each car for instantly opening the supply-circuit to the motors, electromagnetic means for maintaining said devices in their closed position, and means for controlling from any desired point on the train, the supply of current to said electromagnetic means.

27. In a train-control system, the combination with a motor-controller on each motor-car, of electromagnetic means for actuating each controller, and an electromagnetic circuit making and breaking device on each car for instantly opening the supply-circuit to all the motors independently of the movement of said controller, and then causing said electromagnetic actuating means to become operative to move said controllers into their braking positions.

28. In a train-control system, the combination with a motor-controller on each car, of electromagnetic actuating means for each controller, and an electromagnetically-operated device on each car having a plurality of operative positions in one of which it completes the supply-circuit to each motor and in another of which it completes the circuit of auxiliary sources and said electromagnetic actuating means to move said controllers into their braking positions.

29. In a train-control system, the combination with a motor-controller on each motor-car, of electromagnetic actuating means for each controller, and electromagnetic means in each car having a plurality of operative positions in one of which it completes the supply-circuit to each motor, and in another of which it completes circuits between auxiliary sources and said actuating means in such manner as to reverse the direction of movement of said actuating means.

30. In a system of train control for electrically-propelled vehicles, the combination of a main source of supply, a storage battery connected to the main source of supply, and so arranged that when the source of supply decreases or fails, it will supply current for actuating the motor-controllers, motor-controllers for regulating the propelling-motors, pilot-motors for driving the motor-controllers, and means for regulating the current supplied to the pilot-motors, from the battery or main source of supply; the arrangement of connections between said means and the pilot-motors being such that the circuit of the motors is automatically interrupted as soon as the motor-armatures have traveled a predetermined amount.

31. In a system of control for an electrically-propelled vehicle, the combination of a motor-controller provided with contacts connected to an electric circuit, a plurality of stationary contacts mounted thereon to correspond to the steps on the motor-controller, a contact carried by the controller, arranged to establish connection with the stationary contacts, a master-controller having contacts electrically connected respectively to the stationary contacts, and a pilot-motor controlled by the controller-contact for actuating the motor-controller.

32. In a system of control for electric motors, the combination of a master-controller, comprising two sets of contacts mounted for simultaneous movement, a stationary set of brushes, the brushes and contacts being so arranged that as one set of contacts is gradually cut out the second set is cut into circuit, a motor-controller, and a pilot-motor controlled by the master-controller for driving the motor-controller.

33. In a system of control for electric motors, the combination of a master-controller, comprising two similar sets of contacts mounted for simultaneous movement, a set of stationary brushes, a motor-controller provided with a number of contacts corresponding to the set of stationary brushes, a contact arranged to establish connection with the said contacts to complete the circuit of the pilot-motor, and a pilot-motor for driving the motor-controller.

34. In a system of train control, the combination of a number of motor-cars connected to form a train, a motor-controller for each car, a master-controller having a plurality of stationary contacts and two separate movable sets of contacts engaging therewith, said two sets of contacts being separated along a line at an angle to the line of the stationary contacts, a cable containing wires to which the contacts are connected, contacts on the motor-controllers connected to the cable-wires and corresponding to the contacts on the master-controller, and a step-by-step actuating means for completing the circuit through the motor-controller actuating means.

35. In a system of train control, the combination of a number of motor-cars connected to form a train, a motor-controller for each motor-car, a master-controller having a plurality of stationary contacts and two separate movable sets of contacts engaging therewith, a reverse-switch for connecting into circuit one or the other of said two sets of contacts, a cable containing wires to which the contacts are connected, contacts on the motor-controllers connected to the cable-wires and corresponding to the contacts on the master-controller, and a step-by-step actuating means for completing the circuit through the motor-controller actuating means.

36. In a system of control for an electrically-propelled vehicle, the combination of a master-controller, a motor-controller, electromagnetic actuating means for said motor-controller normally in circuit with said master and motor controllers, a plurality of normally open-circuited contacts on both controllers, the corresponding contacts of the two controllers being connected, means for completing the circuit of the master-controller contacts, and means for completing the circuit of the motor-controller contacts.

37. In a system of control for an electrically-propelled vehicle, the combination of a master-controller comprising two sets of similar moving contacts, and brushes mounted for engagement therewith, a motor-controller for regulating the propelling-motors, provided with contacts corresponding to the brushes of the master-controller, a shunt-wound pilot-motor for driving the motor-controller, contacts for completing the armature-circuit of the pilot-motor, and a separate reversing-switch for the pilot-motor.

38. In a system of control for an electrically-propelled vehicle, the combination of an electromagnetic circuit-breaker having the usual open and closed positions, and an additional position wherein it causes the propelling-motors to operate as generators.

39. In a system of control for an electrically-propelled train, the combination of motor-controllers on each car, master-controllers, and a switch separate from the master-controllers for causing said motor-controllers to move into their braking positions.

40. In a system of train control, the combination of a number of motor-cars, a circuit-breaker for each car having the usual open and closed positions, and an additional position wherein it causes different motor connections to be established, and means whereby its action may be controlled either from the car upon which it is located, or from one of the other cars on the train.

41. The combination in a gravity circuit-breaker having the usual open and closed positions, of an electromagnet for maintaining the breaker in the closed position, and a second electromagnet for maintaining the breaker in the open position.

42. In a train system of control, the combination of a plurality of motor-cars, a circuit-breaker for each motor-car, having the usual open and closed positions, and magnets for maintaining the breaker in the open and closed positions, and switches located on the various cars for controlling the action of the breakers.

43. In a system of train control, the combination of a plurality of motor-cars united mechanically to form a train, a motor-controller for each motor-car, means for actuating each motor-controller, and a circuit-breaker for each car having the usual open and closed positions, and in addition a position wherein it closes the circuit of the means employed to actuate the motor-controller.

44. In a system of train control, the combination of a plurality of motor-cars, mechanically connected to form a train, or a portion of a train, a motor-controller for each motor-car, a pilot-motor for driving each motor-controller, and a circuit-breaker so arranged that it first opens the circuit of the propelling-motors, and their controller, then closes the circuit of the pilot-motor in a manner to cause it to drive the motor-controller from a power position to its off position.

45. In a system of control for electric motors, the combination of a source of supply, a motor-controller, a pilot-motor for driving the controller forward and back in a step-by-step manner, a storage battery which is permanently connected in circuit in such manner that it will, upon the partial or total failure of the main source of supply, furnish current to the pilot-motors, and a master-controller for regulating the action of the pilot-motors.

In witness whereof I have hereunto set my hand this 7th day of July, 1898.

WILLIAM B. POTTER.

Witnesses:
 EDWARD P. MACLEAN,
 PAUL F. PIGNET.